(12) United States Patent
Collot et al.

(10) Patent No.: US 7,155,968 B2
(45) Date of Patent: Jan. 2, 2007

(54) MULTIFUNCTION PROBE WITH VARIABLE FLEXURE

(75) Inventors: Lionel Collot, Vendome (FR); Nicolas Hanson, Danze (FR)

(73) Assignee: Thales, Neuilly sur Seine (FR)

( * ) Notice: Subject to any disclaimer, the term of this patent is extended or adjusted under 35 U.S.C. 154(b) by 22 days.

(21) Appl. No.: 10/534,046

(22) PCT Filed: Dec. 13, 2002

(86) PCT No.: PCT/FR02/04347

§ 371 (c)(1),
(2), (4) Date: May 6, 2005

(87) PCT Pub. No.: WO03/054557

PCT Pub. Date: Jul. 3, 2003

(65) Prior Publication Data

US 2006/0086184 A1      Apr. 27, 2006

(30) Foreign Application Priority Data

Dec. 14, 2001   (FR) .................................. 01 16160

(51) Int. Cl.
*A63B 53/00* (2006.01)

(52) U.S. Cl. ............................... 73/170.02; 73/170.04; 73/180

(58) Field of Classification Search ............. 73/170.02, 73/170.04, 180
See application file for complete search history.

(56) References Cited

U.S. PATENT DOCUMENTS

| 4,672,846 | A | * | 6/1987 | LeBlond et al. | ............... 73/180 |
| 5,257,536 | A | * | 11/1993 | Beigbeder et al. | ............ 73/180 |
| 6,609,421 | B1 | * | 8/2003 | Cronin et al. | ............ 73/170.02 |
| 6,668,640 | B1 | * | 12/2003 | Alwin et al. | ............. 73/170.02 |
| 6,679,112 | B1 | * | 1/2004 | Collot et al. | ............. 73/170.04 |
| 6,817,240 | B1 | * | 11/2004 | Collot et al. | ............. 73/170.02 |
| 6,941,805 | B1 | * | 9/2005 | Seidel et al. | ............. 73/170.02 |

\* cited by examiner

*Primary Examiner*—Edward Lefkowitz
*Assistant Examiner*—Andre Allen
(74) *Attorney, Agent, or Firm*—Lowe Hauptman & Berner LLP

(57) ABSTRACT

The invention relates to a multifunction probe for aircraft. The probe has a mobile vane intended to align with the axis of an air flow around the probe. The mobile vane comprises first pressure pickup means for measuring the total pressure of the flow and second pressure pickup means for measuring the static pressure of the flow. The mobile vane furthermore has a profile whose flexure is variable.

11 Claims, 2 Drawing Sheets

MULTIFUNCTION PROBE WITH VARIABLE FLEXURE

CROSS REFERENCE TO RELATED APPLICATIONS

The present Application is based on International Application No. PCT/FR02/04347, filed on Dec. 13, 2002, which in turn corresponds to FR 01/16160 filed on Dec. 14, 2001, and priority is hereby claimed under 35 USC §119 based on these applications. Each of these applications are hereby incorporated by reference in their entirety into the present application.

BACKGROUND OF THE INVENTION

The invention relates to a multifunction probe for aircraft. The piloting of any aircraft requires knowledge of its relative velocity with respect to the air, i.e. with respect to the relative wind. This velocity is determined with the aid of sensors for the static pressure Ps, the total pressure Pt and the angle of incidence α. α provides the direction of the velocity vector in a reference system, or frame, associated with the aircraft and (Pt-Ps) provides the modulus of this velocity vector. The three aerodynamic parameters therefore make it possible to determine the velocity vector of an airplane and, incidentally, of a tilting-rotor aircraft referred to as a convertible.

The various sensors for measuring static pressure, total pressure and incidence may be combined in a so-called multifunction probe. This probe may be mobile, like the one described in French Patent FR 2 665 539. It will then have a vane which is mobile about an axis perpendicular to the skin of the aircraft on which the probe is fitted. The mobile vane aligns naturally with the axis of the air flow around the aircraft, and the angular position of the vane around the axis of rotation gives the local angle of incidence $\alpha_{loc}$ of the probe. Furthermore, the sensor for total pressure Pt is for example produced by means of a tube, referred to as a Pitot tube, which is secured to the vane and opens facing the flow at one of the ends of the tube. The other end of the tube is substantially closed. A pressure sensor measures the pressure of the air at the bottom of the tube in the vicinity of its closed end. For the pressure measured by the sensor to optimally represent the total pressure Pt of the air flow around the aircraft, it is important for the Pitot tube to be outside of a boundary layer which develops in the air flow in the immediate vicinity of the skin of the aircraft. Inside this boundary layer, the closer one is to the skin of the aircraft, the more a measured value of total pressure taken there will approach the value of the static pressure, and the less it will be possible to determine the modulus of the velocity vector of the aircraft with precision. The thickness of the boundary layer depends on the shape of the skin of the aircraft, and especially on the distance between the nose of the aircraft and the probe. At the conventional positions where a multifunction probe is placed, for example, the thickness of the boundary layer is of the order of 7 to 8 cm on a wide body airplane. An optimum position of the Pitot tube is therefore when it protrudes by about 10 cm from the skin of the aircraft.

The multifunction probe furthermore has pressure pickups arranged on the lateral faces of the mobile vane, making it possible to measure the static pressure of the air flow around the aircraft. In contrast to the Pitot tube, the pressure pickups for measuring the static pressure, which are referred to as static pressure pickups, may lie inside the boundary layer. However, the pressure measured by these pressure pickups, which is denoted Ps, is different to the local static pressure denoted Ps loc which would prevail at the position where the probe is fixed on the skin of the aircraft if the probe was not there, that is to say without perturbation. Nevertheless, the local static pressure Ps loc can be calculated using a pressure coefficient Kp of the probe. More precisely, Kp depends on the shape of the vane and the position of the pressure pickups on the vane. The coefficient Kp can be defined in the following way:

$$Kp = \frac{Ps - Psloc}{Ptloc - Psloc}$$

where Ptloc represents the total pressure measured in the static pressure pickups.

In order to calculate the local static pressure Psloc, it is therefore necessary to know the pressure coefficient Kp of the probe as well as the local total pressure Ptloc. The pressure coefficient Kp is determined by calibration in a wind tunnel. During this calibration, the boundary layer developed along the stream of the wind tunnel is thin enough for the static pressure pickups to be outside the boundary layer. In this case, the total pressure Ptloc prevailing at the static pickups is the same as the pressure Pt measured by the Pitot tube.

But if the static pressure pickups lie in the boundary layer, then the total pressure Ptloc at the static pickups is not equal to that observed in the Pitot tube, and the calibrations carried out in a wind tunnel are no longer usable.

One solution for overcoming this problem is to make the pressure coefficient Kp zero. In this way, the measured pressure gives the local static pressure Psloc directly, regardless of the value of the total pressure Ptloc at the static pressure pickups.

One effective way of reducing the pressure coefficient Kp to a value of about zero is to increase the flexure of the vane. The flexure λ of the vane is defined as the angle which the leading edge of the vane makes with a direction perpendicular to the skin of the aircraft, or in other words with the axis of rotation of the vane. Specifically, assuming the flow to be incompressible and the fluid forming the flow to be ideal, the pressure coefficient Kp can be expressed by the following equation:

$$Kp = 1 - \left(\frac{V}{V\infty}\right)^2$$

where V represents the velocity of the flow at the pressure pickups and V∞ represents the velocity of the flow upstream of the probe. The above equation defines the coefficient of the pressure Kp for a zero flexure. When the leading edge of the vane is inclined by a flexure λ, the coefficient Kp is expressed in the following way:

$$Kp = 1 - \frac{V^2 + (V\infty xtg\lambda)^2}{\left(\frac{V\infty}{\cos\lambda}\right)}$$

-continued $$\text{whence } Kp = \left[1 - \left(\frac{V}{V\infty}\right)^2\right]x(\cos\lambda)^2$$

The implication of this is that the pressure coefficient Kp will be closer to zero when the flexure λ is larger. In other words, the more inclined the leading edge of the vane is with respect to its axis of rotation, the less the vane will perturb the flow.

In view of the other constraint mentioned above, however, namely sufficient extension of the vane to support the Pitot tube outside the boundary layer, there would be a risk of obtaining a vane of which the length of the leading edge is too great. This would result in a oversized vane.

It is an object of the invention to overcome this drawback by providing a probe whose extension is sufficient, whose pressure coefficient Kp of the static pressure pickups is close to zero and whose size is reduced.

SUMMARY OF THE INVENTION

In order to achieve this object, the invention relates to a multifunction probe for aircraft, having a mobile vane intended to align with the axis of an air flow around the probe, the mobile vane comprising first pressure pickup means for measuring the total pressure of the flow, second pressure pickup means for measuring the static pressure of the flow, characterized in that the mobile vane has a profile whose flexure is variable.

The multifunction probes fitted on aircraft are required to operate under extreme climatic conditions, and the probe has means for heating it in order to avoid the formation of ice on the outer walls of the probe or even inside orifices, such as the Pitot tube or the static pressure pickups, these means being formed by a heating element arranged inside the probe, for example. It will be understood that the larger the size of the probe is, the higher the electrical power that can be dissipated in the heating element will need to be. The warming power to be used for de-icing the probe will also be reduced by reducing the size of the probe.

Another advantage associated with the size reduction of a probe according to the invention is the reduction of the inertia of the vane in its rotational movement for alignment with the axis of the air flow around it. This lower inertia allows better sensitivity for the local incidence measurement, which gives the angular position of the vane. When the rotational movement of the vane about its axis is slaved as a function of the incidence pressure measurement carried out in the vicinity of the leading edge of the vane, in order to improve the incidence measurement, reducing the inertia of the vane furthermore makes it possible to reduce the power needed for motorization of the slaving of the probe. For further details about slaving the rotational movement of the vane, reference may be made to the French Patent published under No. FR 2 665 539.

The invention will be understood more clearly, and other advantages will become apparent, on reading the detailed description of an embodiment of the invention, this description being illustrated by the appended drawing in which:

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

DETAILED DESCRIPTION OF THE INVENTION

Figure 1:
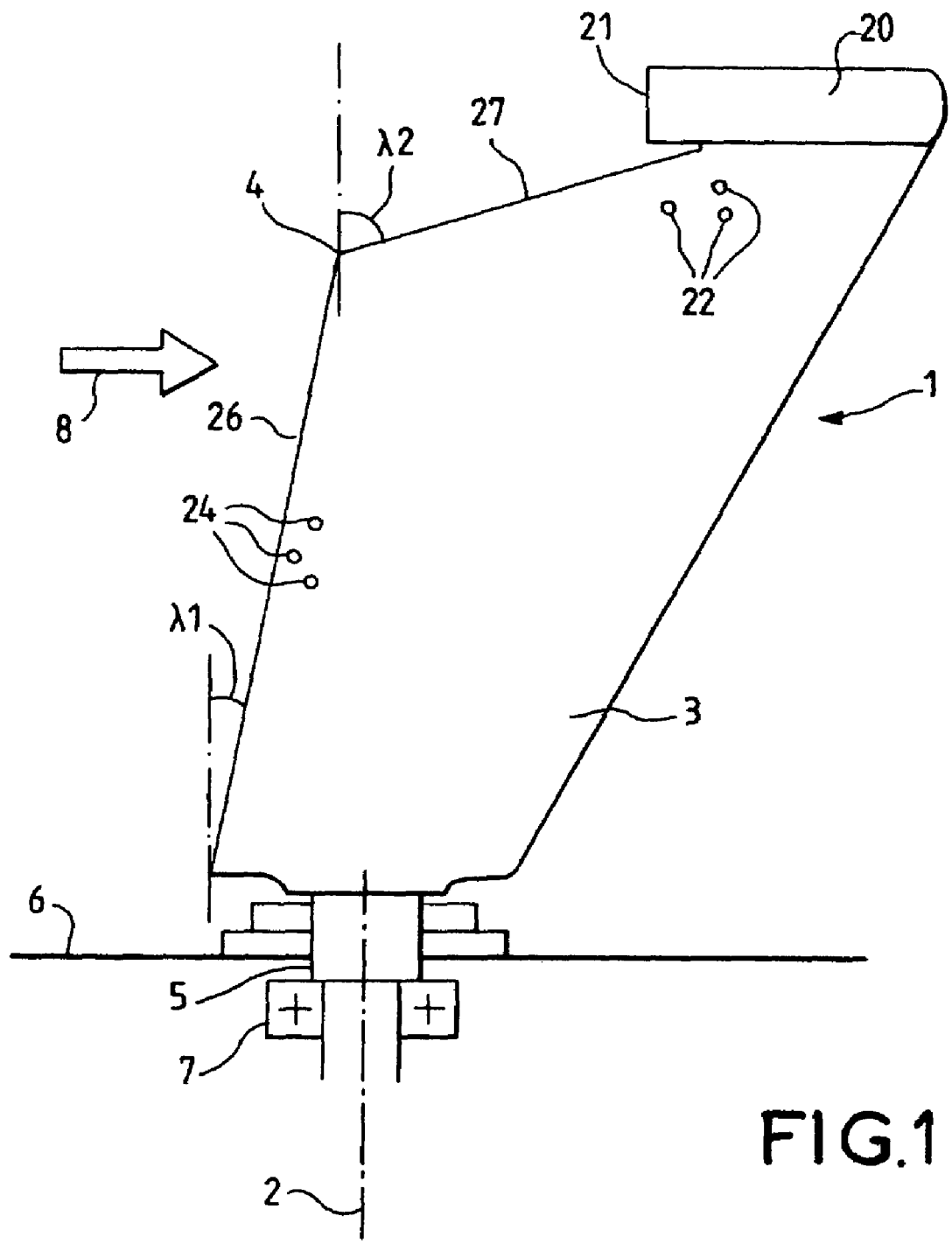
FIG. 1 represents a multifunction probe whose flexure is large in the vicinity of the Pitot tube.
Figure 2:
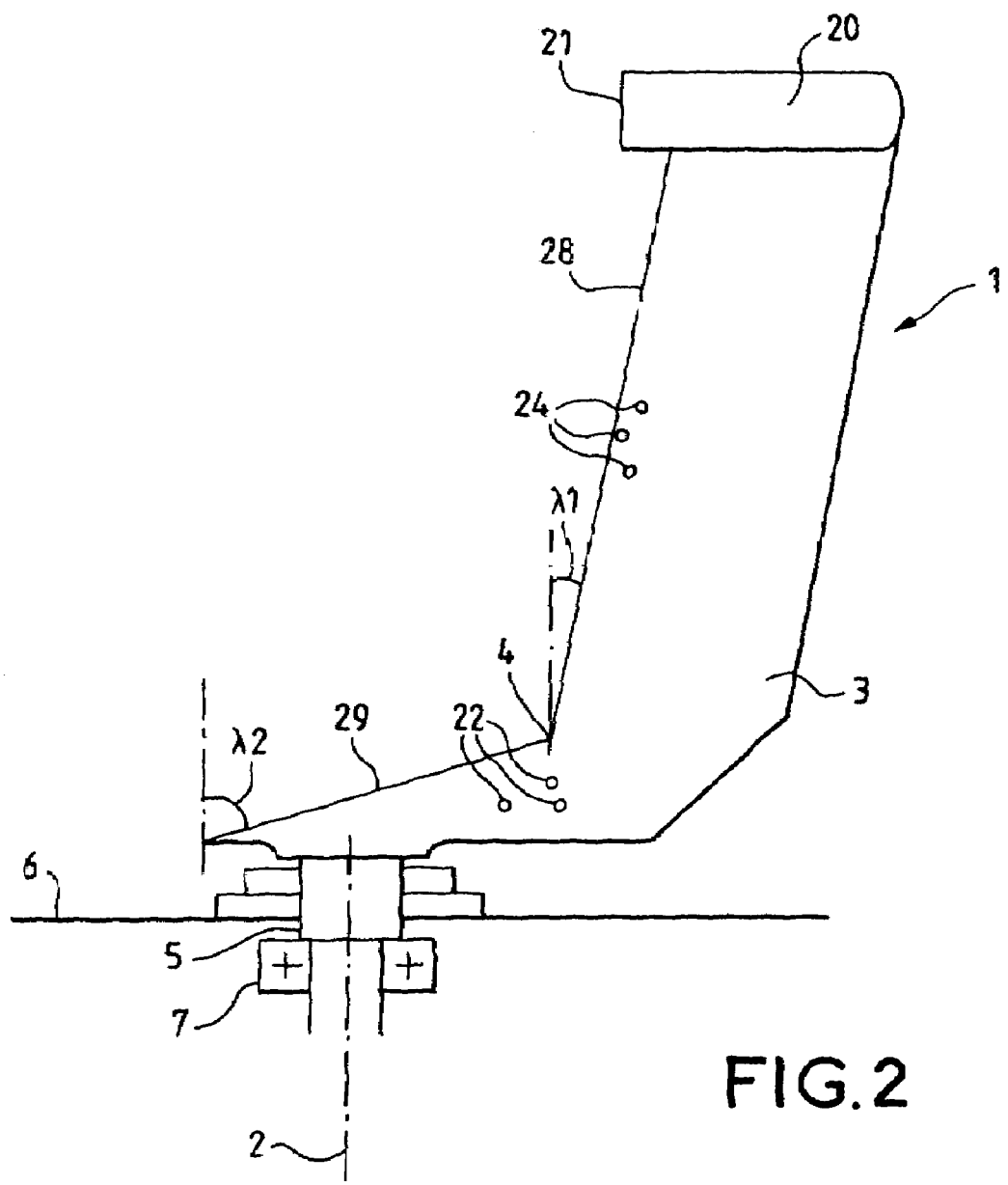
FIG. 2 represents a multifunction probe whose flexure is large in the vicinity of the skin of the aircraft on which it is fitted.

The probes represented in FIGS. 1 and 2 have a vane 1 which is mobile in rotation about an axis 2. The vane 1 includes a fin 3 which has a plane of symmetry, parallel to the plane of the figure, which separates the top surface from the bottom surface. The profile of the fin 3 perpendicular to its leading edge 4 is, for example, of the OOZT type defined by the N.A.C.A. It is clear that other shapes of fins may be used for carrying out the invention. The vane 1 also has a shaft 5 of axis 2 which penetrates inside the skin 6 of an aircraft. The shaft 5 is mobile in rotation with respect to the aircraft, for example by means of a rolling bearing 7.

Owing to the shape of the fin 3, the vane 1 aligns naturally with the axis of the air flow around the mobile vane 1. The axis of the flow is shown by the arrow 8 represented in FIG. 1.

The probes furthermore have means for measuring the total pressure Pt and the static pressure Ps of the air flow, as well as the incidence i of the aircraft.

The means for measuring the total pressure include, for example, a pickup for total pressure Pt comprising a channel 20 which opens through an orifice 21 substantially facing the air flow, the axis of which is 8. The channel 20 is better known by the term Pitot tube.

The means for measuring the static pressure Ps have, for example, two static pressure pickups 22 and 23, each located on one of the faces of the mobile vane 1. Only the pressure pickup 22 can be seen in FIG. 1. The pressure pickup 23 is placed on the non-visible face of the mobile vane 1, essentially symmetrically to the pressure pickup 22 with respect to the plane of symmetry of the fin 3. This plane of symmetry is parallel to the plane of FIG. 1. Each pressure pickup 22 and 23 may have a plurality of orifices, three being represented in FIG. 1, particularly in order to limit the cross section of each orifice so as to perturb the air flow around the mobile vane 1 less, or alternatively to be able to take the pressure measurement even if one of the orifices is obstructed. The two static pressure pickups 22 and 23 are in communication with a chamber lying inside the vane, in order to average the pressure between the two pickups 22 and 23.

The means for measuring the incidence α of the aircraft have, for example, two incidence pressure pickups 24 and 25 located, as in the case of the static pressure pickups 22 and 23, on one of the faces of the vane, also essentially symmetrically with respect to the plane of symmetry of the fin 3. The incidence pressure pickups 24 and 25 are not in communication, and it is the difference between the pressures prevailing at each pickup 24 and 25 which makes it possible to determine the exact incidence of the mobile vane 1, and consequently that of the aircraft. In order to improve the sensitivity of the incidence measurement, the pressure pickups 24 and 25 may be placed in the immediate vicinity of the leading edge 4 of the mobile vane 1.

The way of using the information obtained from the various pickups, for total and static pressure and incidence, is described in French Patent FR 2 665 539, for example. That Patent describes in particular the slaving of the angular position of the mobile vane 1 around its axis 2, so that the fin 3 of the mobile vane 1 is optimally aligned with the axis 8 of the air flow.

In the two embodiments of the invention which are represented in FIGS. 1 and 2, the profile of the mobile vane has a variable flexure. The flexure of the mobile vane is defined as the angle which the leading edge of the mobile vane makes with respect to the axis 2 of rotation of the mobile vane. More precisely, the flexure has a first value over a first part of the profile and a second value over a second part of the profile. Put another way, the leading edge of the vane forms a broken line. In the first part of the profile, that is to say in the vicinity of the incidence pressure pickups, the value $\lambda 1$ of the flexure is less than the value $\lambda 2$ of the flexure in the second part of the profile, which lies in the vicinity of the static pressure pickups 22 and 23. More precisely, the flexure has a constant value $\lambda 2$ upstream of the incidence pressure pickups, and the flexure has a constant value $\lambda 1$ upstream of the static pressure pickups. The term "upstream of the incidence or static pressure pickups" is intended to mean the part of the profile of the mobile vane that can aerodynamically affect the incidence or static pressure pickups, respectively, when the mobile vane experiences an air flow whose direction is substantially perpendicular to the axis 2.

In a first embodiment of the invention, i.e. the embodiment represented in FIG. 1, the first part 26 of the profile is closer to the skin 6 of the aircraft than the second part 27 of the profile. This variant allows the static pressure pickups 22 and 23 to be placed as far as possible away from the skin 6 of the aircraft. The local total pressure Ptloc at the static pressure pickups 22 and 23 is thus as close as possible to the total pressure Pt measured by the Pitot tube 20. This arrangement is beneficial because the pressure coefficient Kp of the static pressure pickups 22 and 23 also depends on the velocity of the aircraft. In practice, the flexure $\lambda 2$ makes it possible to reduce the amplitude of the variation in the pressure coefficient Kp as a function of the velocity of the aircraft. Thus, if Ptloc is equal or substantially equal to Pt, the pressure measurement Ps taken in the static pressure pickups 22 and 23 makes it easy to calculate the local static pressure Psloc at the place where the probe is positioned on the skin 6 of the aircraft.

The value $\lambda 2$ of the flexure is advantageously defined so that a value Kp of the pressure coefficient of the static pressure pickups is substantially zero for a given velocity range of the air flow, the range containing in particular the cruising speed of the aircraft.

In a second embodiment of the invention, i.e. the embodiment represented in FIG. 2, the first part 28 of the profile is further away from the skin 6 of the aircraft than the second part 29 of the profile. This variant makes it possible to further reduce the inertia of the vane.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A multifunction probe for aircraft, having a mobile vane intended to align with the axis of an air flow around the probe, the mobile vane comprising first pressure pickup means for measuring the total pressure of the flow, second pressure pickup means for measuring the static pressure of the flow, characterized in that the mobile vane has a profile whose flexure is variable, in that the flexure has a first value over a first part of the profile of the vane, in that the flexure has a second constant value over a second part of the profile of the vane upstream of and in the vicinity of the second pickup means for pressure, and in that the first value is less than the second value.

2. The multifunction probe as claimed in claim 1, wherein it includes third pressure pickup means, which are intended to measure the incidence ($\alpha$) of the mobile vane with respect to the air flow, and in that the flexure has a constant value upstream of the third pickup means for pressure.

3. The multifunction probe as claimed in claim 1, wherein it is arranged on the skin of the aircraft, in that the first pickup means for pressure are located outside a boundary layer developed in the flow in the vicinity of the skin of the aircraft.

4. The multifunction probe as claimed in claim 1, wherein it is arranged on the skin of the aircraft, and in that the first part of the profile is closer to the skin of the aircraft than the second part of the profile.

5. The multifunction probe as claimed in claim 1, wherein the second flexure value is defined so that a value of the pressure coefficient of the second pickup means for pressure is substantially zero for a given velocity of the air flow.

6. The multifunction probe as claimed in claim 2, wherein it is arranged on the skin of the aircraft, in that the first pickup means for pressure are located outside a boundary layer developed in the flow in the vicinity of the skin of the aircraft.

7. The multifunction probe as claimed in claim 2, wherein it is arranged on the skin of the aircraft, and in that the first part of the profile is closer to the skin of the aircraft than the second part of the profile.

8. The multifunction probe as claimed in claim 3, wherein it is arranged on the skin of the aircraft, and in that the first part of the profile is closer to the skin of the aircraft than the second part of the profile.

9. The multifunction probe as claimed in claim 2, wherein the second flexure value is defined so that a value of the pressure coefficient of the second pickup means for pressure is substantially zero for a given velocity of the air flow.

10. The multifunction probe as claimed in claim 3, wherein the second flexure value is defined so that a value of the pressure coefficient of the second pickup means for pressure is substantially zero for a given velocity of the air flow.

11. The multifunction probe as claimed in claim 4, wherein the second flexure value is defined so that a value of the pressure coefficient of the second pickup means for pressure is substantially zero for a given velocity of the air flow.

* * * * *